June 19, 1928.  1,674,083

C. E. F. AHLM ET AL

TRANSMISSION GEARING

Filed Oct. 13, 1926  3 Sheets-Sheet 1

Inventors
Charles E. F. Ahlm
George M. Soule
By Bates, Macklin, Gobrick & Teare.
Attorneys June 19, 1928.   C. E. F. AHLM ET AL   1,674,083
TRANSMISSION GEARING
Filed Oct. 13, 1926   3 Sheets-Sheet 3

Inventors
Charles E. F. Ahlm
George M. Soule
By Bates, Macklin, Golrick & Teare
Attorneys Patented June 19, 1928.

1,674,083

UNITED STATES PATENT OFFICE.

CHARLES E. F. AHLM, OF CLEVELAND, AND GEORGE M. SOULE, OF EUCLID VILLAGE, OHIO, ASSIGNORS TO AUTOMOTIVE PATENT HOLDING COMPANY, OF CLEVELAND, OHIO, A CORPORATION OF DELAWARE.

TRANSMISSION GEARING.

Application filed October 13, 1926. Serial No. 141,413.

This invention relates to change speed transmission gearing and the general object is to provide an improved and simplified gearing which may be arranged to transmit a number of different speeds from a driving shaft, including both over drive and under drive. A specific object is to provide an improved gearing employing internal and external gears for quietness of transmission and which will operate to effect changes in speed without shifting a driving gear from one driving position to another. More specifically it is an object to provide a transmission gearing in which substantially all of the parts are easily manufactured, which will be very compact and easily assembled and which may be easily and quickly operated to change from one speed to another.

The drawings show two modifications one being capable of connecting a pair of shafts for four speeds, the other being capable of effecting the same speed changes and reverse. The gearing employs certain of the principles set forth in the prior application of Charles E. F. Ahlm, Serial No. 133,561, filed August 4th, 1926.

Further objects and features of the invention will become apparent from the further description relating to the accompanying drawings showing the preferred forms. The essential characteristics are summarized in the claims.

Figure 1:
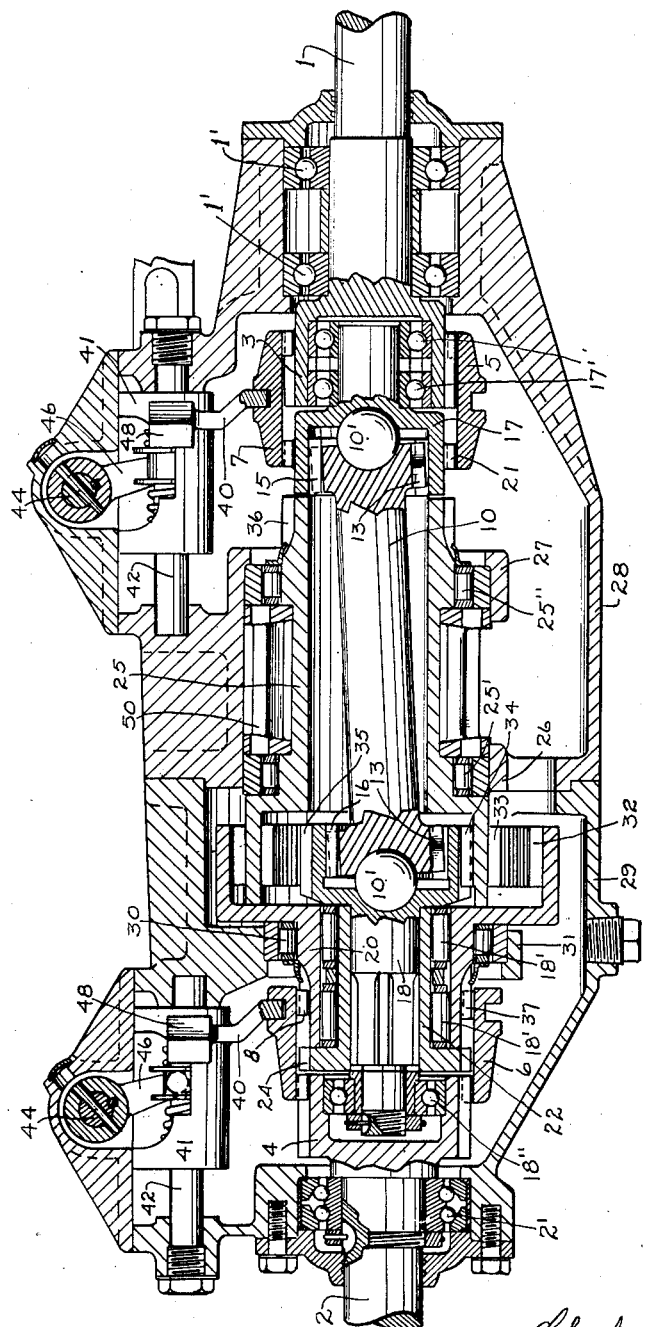
Figure 2:
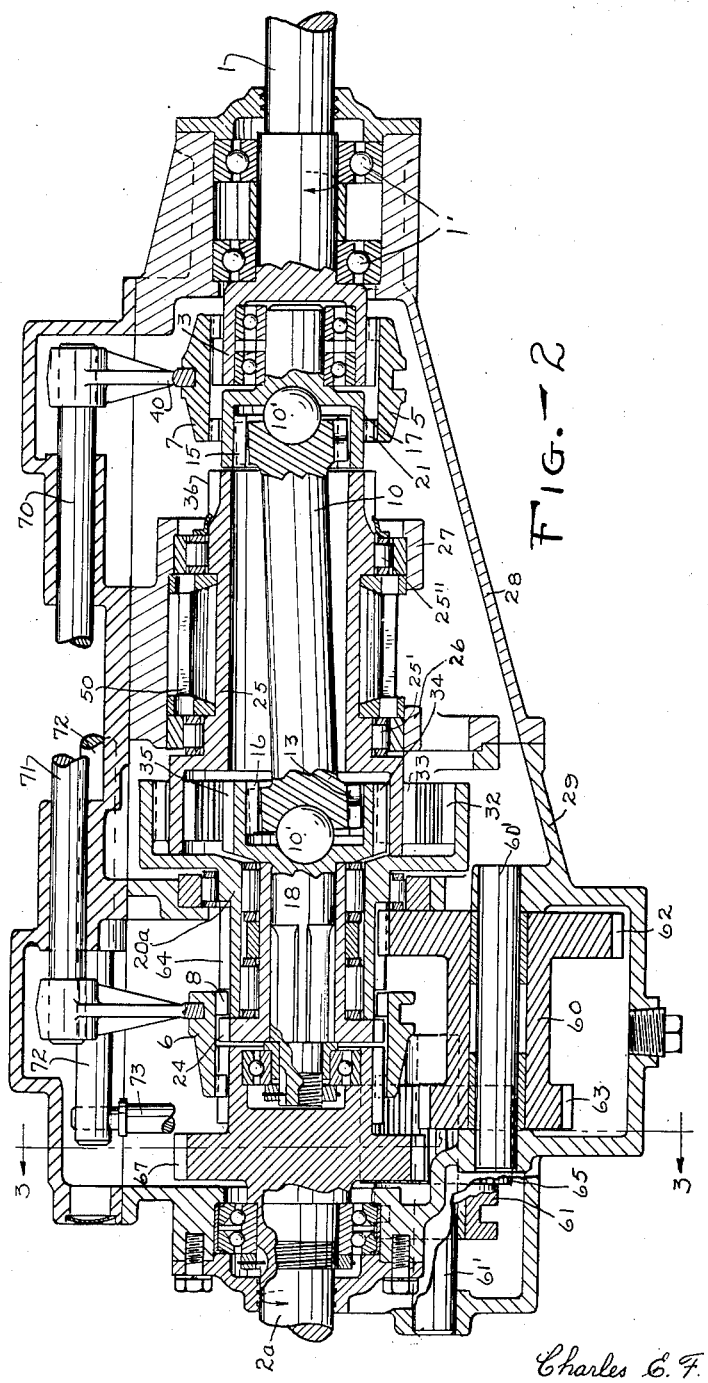
Figure 3:
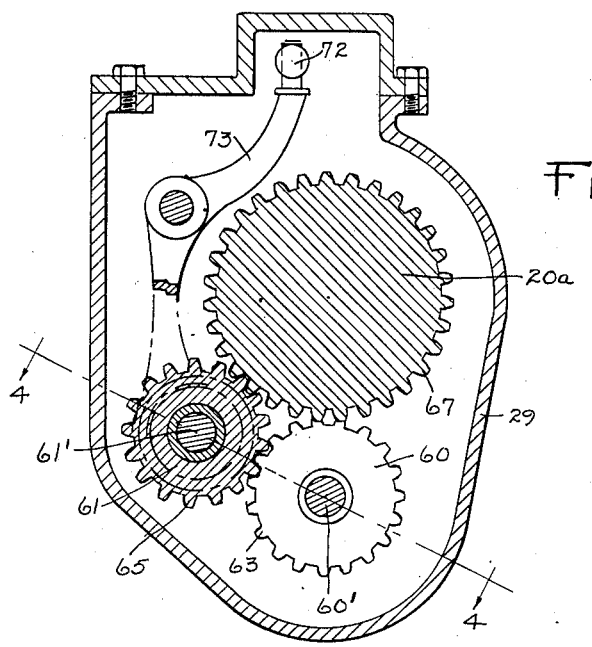
Figure 4:
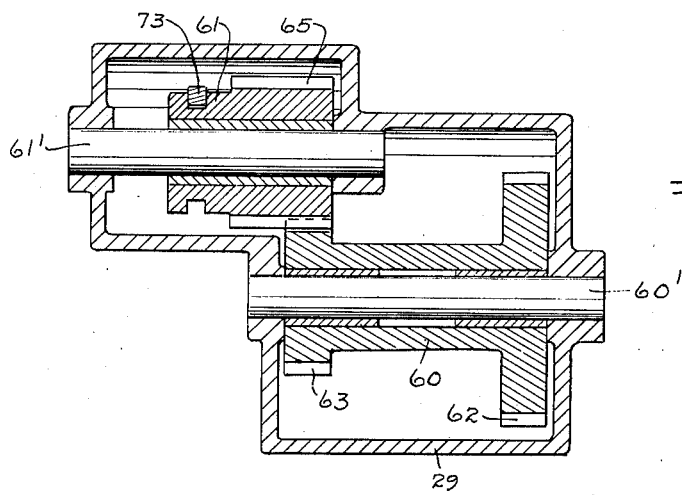

In the drawings Fig. 1 is a substantially central longitudinal cross sectional view through one form of the gearing; Fig. 2 is a similar view of another form showing the reversing characteristics; Fig. 3 is a transverse cross sectional view taken along the line 3—3 on Fig. 2; Fig. 4 is a fragmentary longitudinal cross sectional view taken along the line 4—4 on Fig. 3.

In one of the preferred forms the gearing comprises generally a pair of shafts, one being on an axis offset with reference to the other and capable of being directly connected thereto by reason of an inclined shaft having a universal joint connection at each end with intermediate connecting members coaxial with the respective shafts. For other speed relations there is provided a hollow sleeve or compound gear having internal and external gear teeth, one set meshing with teeth carried by one of the aforesaid intermediate members, the other set meshing with a single gear connectible to one of the shafts and journalled for relative rotation on the axis of this member. The speed changes which may be effected are, first: direct drive through the inclined shaft, second: reduced speed through the hollow compound gear and one of the simple gears, third: a further reduced speed through both the simple gears and the compound gear, and fourth: over speed drive through the compound gear and another simple gear. Clutch means are shown for making the various connections whereby the gears do not have to be shifted into and out of mesh. The other embodiment is substantially the same with the exception of the reversing mechanism which as illustrated comprises countershafts and spur gears, one of which is slidable into and out of mesh with a cooperating gear.

Referring in detail to the drawings and first to Fig. 1, a shaft 1, which will for convenience be hereinafter termed the drive shaft, is supported on rolling bearings 1' in a casing section 28, and the driven shaft 2 is similarly supported on rolling bearings 2' carried by another casing section 29. Both these shafts have on their inner ends enlargements 3 and 4 respectively to which clutch sleeves 5 and 6 are splined, the clutches having internal teeth 7 and 8 adapted to cooperate with clutch teeth on the various gears and other intermediate members as will be presently shown. 10 indicates an intermediate inclined shaft for effecting direct drive, this shaft having on each end specially formed external teeth 13, engaging internal teeth 15 and 16. The teeth 15 are carried by a stub shaft member 17, freely journalled but rigidly supported in bearings 17' in the rear end of the shaft 1. The teeth 16 are formed in a stub shaft 18 journalled in separated sets of bearings 18' and 18" supported by the hollow hub of a simple gear member 20 and by the enlargement 4 of the driving shaft 2 respectively.

To enable the axially offset shafts 1 and 2 to be connected without unduly increasing the size of the gearing, we utilize a very simple universal dental connection between the shaft 10 and the members 17 and 18. Such connection is more fully disclosed in the above mentioned application of Charles E. F. Ahlm and consists in beveling or rounding off the teeth on the ends of the shaft 10 in such a manner that contact is had with all the cooperating internal teeth 15 and 16 at all times this contact however permitting the universal driving action. The general plane of the thickened portions of the external teeth should be substantially at the point where the axes of the shafts 1 and 2 intersect the axis of the shaft 10, and to maintain this relation, sepherical members 10' are provided at each end of the shaft 10 and retained in central position relative to the shaft 10 and the members 17 and 18 by reason of complementary recesses in these members.

To effect a direct drive connection between the driving and driven shafts the stub shaft 18 has splined thereto a sleeve 22, carrying teeth 24 engageable by the teeth 8 on the sleeve 6 when this sleeve is in its rearmost position, thereby connecting the stub shaft directly to the shaft 2. At such time the teeth 7 on the sleeve 5 may engage teeth 21 on the member 17 and thus the shaft 1, through the intermediacy of the inclined shaft will be, in effect, directly connected to the shaft 2.

The hollow compound gear, indicated at 25, is supported on rolling bearings 25' and 25" in casing rings 26 and 27 of the casing section 28, this rigid support maintaining the compound gear on a fixed axis concentric with the shaft 1 and eccentric to the shaft 2. The simple gear 20 is shown as externally supported by a single series of rolling bearings 30 in a member 31 rigid with the rearward casing section 29, the bearing 30 thus serving to indirectly support the shaft 18 by reason of the bearings 18'. The simple gear 20 has a set of internal teeth 32 meshing with the external teeth 33 of the compound gear and the simple gear 35 has external teeth meshing with the internal teeth 34 of the compound gear. As shown the gear 35 is rigid with the stub shaft 18 although if desired it could be made separate therefrom and provided with separate clutch teeth such as 24 and thereby eliminate rotation of the gears entirely when the shafts 1 and 2 are directly connected.

In order to drive the compound gear directly by the shaft 1 the hub of this gear has clutch teeth 36 on its forward end engageable by the teeth 7 of the clutch sleeve 5. To connect the shaft 2 to the simple gear 20, this gear has clutch teeth 37 shown as engageable by the teeth 8 on the clutch sleeve 6.

The first reduced speed is attained by shifting the sleeve 5 to cause the teeth 7 and 36 to engage and by shifting the sleeve 6 to cause the teeth 8 and 37 to engage. Thus the shaft drives the hub of the gear 25 and, by reason of the difference in sizes of the gears 33 and 32, the simple gear 20, carrying these latter teeth, is driven at a reduced speed and this speed is transmitted to the shaft 2 through the clutch sleeve 6.

For a further reduced speed the sleeve 5 is shifted to the position shown in Fig. 1, the sleeve 6 remaining in the same position as before, namely as shown, in which case the shaft 1 drives through the inclined shaft 10. The member 18 which carries the teeth 35 drives the compound gear 25 at a reduced speed and the compound gear drives the gear 20 at a still further reduced speed.

For the over-drive the sleeve 5 is shifted rearwardly to cause the teeth 7 and 36 to engage which will cause the member 18 to be driven at a higher speed than the drive shaft by reason of the teeth 34 and 35, the member 18 being for this condition directly connected to the driven shaft through the clutch teeth 8 and 24.

Any suitable means may be employed to shift the clutch sleeves 5 and 6 to their proper relative positions for the above speeds. As shown, the sleeves 5 and 6 are engaged by shipper arms 40 on respective shifting carriages 41 mounted on respective bars 42 supported in casing sections 28 and 29. The carriages may be conveniently shifted by rock shafts 44 having arms 46 resiliently connected to the carriages. Means for maintaining the carriages in their shifted positions may comprise spring pressed plungers (not shown) engaging wedge shaped projections 48 rigid with the carriages. Suitable means for changing the sleeves from one positon to another in proper relation to effect the above speeds may comprise a shifting lever or levers connected to the rock shafts by suitable linkage (not shown).

The two part housing illustrated enables the various members to be easily assembled. The assembling may be effected as follows: The shaft 2 and clutch sleeve 6 may be first inserted into the casing section 29. The stub shaft 18 and sleeve 22 may be then assembled through the hub of the gear 20 and the gear 20 then slid into place with its bearings 30 into the casing section 29. The shaft 1 may be then slid into the casing section 28, the clutch sleeve put into place and the member 17 assembled in the enlarged head 3 on the shaft 1. The compound gear may then be slid into place from the rear toward the front into its bearings 25' and 25", these bearings being maintained separated by a cut-away sleeve 50. The inclined shaft may then be put into place with the forward teeth 13 in mesh with the teeth 15 on the member 17, and the casing sections may be then bolted together in the usual manner.

In the embodiment shown in Figs. 2 to 4, the parts which correspond to those of Fig. 1 are similarly numbered. The main difference is in the reversing gearing which as shown includes external spur gear members 60 and 61, mounted on respective shafts 60' and 61'. The member 60 has teeth 62 and 63, the former being in permanent mesh with teeth 64 on the simple gear 20ᵃ (shown as extended to also engage the clutch teeth 8), the latter being shown in mesh with teeth 65 on the gear member 61. The teeth 65 permanently engage external teeth 67 on the driven member 2ᵃ and may be slid into and out of mesh with the teeth 63 to establish and interrupt the reverse drive. As shown in Fig. 2 the parts are in position to transmit reverse rotation between the shafts 1 and 2 at a very low speed, namely through all the internal and external gears and the inclined shaft, the gear 20ᵃ driving the gear member 60 which in turn drives the idler gear 61, the latter driving the gear 67 reversely of the shaft 1. Another and higher reverse speed would be obtained by shifting the sleeve 5 to its other driving position in which case the speed of the gear 20ᵃ would be reduced through the gear sets 32 and 33 alone.

In Figs. 2 and 3 shifting of the clutch sleeves 5 and 6 as well as the idler gear 61 may be controlled from a central position over the casing by reason of the provision of a forwardly extending shifting bar 70 connected to the sleeve 5, a rearwardly extending bar 71 connected to the sleeve 6 and another rearwardly extending bar 72 connected by a slidably mounted fork 73 (Fig. 3) to the gear 61. The usual slotted guide plate and selector lever (not shown) may thus be used to control all the speeds at a common point.

From the above description it will be seen that we have provided a very compactly arranged gearing capable of quietly transmitting a number of different speeds from one shaft to another, in which all the rotating parts are well supported for rotation and so arranged that they may be easily lubricated, in which the parts may be easily manufactured and assembled, and which may be conveniently operated to change from one speed to another without having to disengage any of the cooperating internal and external gears.

We claim:

1. In a gearing, two axially offset shafts, means for connecting the adjacent ends of said shafts so that both rotate in the same direction at the same speed and for interrupting said connection, means for connecting said shafts in two other relations including two relatively rotatable gears, a compound gear connectible to one of the shafts, each of said two gears meshing with a respective set of teeth on the compound gear, and means for connecting each of the said two gears selectively to the other shaft.

2. In a gearing, two concentric gears one having internal the other external teeth, a compound eccentrically mounted gear having both internal and external teeth meshing with teeth of respective concentric gears, a pair of shafts one connectible to the compound gear and the other to the concentric gears selectively whereby the latter may be rotated at greater and less speed than the former, and means for connecting the shafts for direct drive.

3. In a gearing, a pair of axially offset shafts, a hollow sleeve, means extending through the sleeve for connecting the shafts for direct drive, gear teeth on the sleeve, a direct drive connection between the sleeve and one shaft and means including a gear journalled for free rotation relative to the other shaft, coaxial therewith and meshing with the aforesaid gear teeth for imparting a different speed to the other shaft.

4. In a gearing, two shafts, means intermediate the shafts for connecting them for direct drive, a hollow compound gear in surrounding relation to said intermediate means and connectible to one of the shafts, and a plurality of gears in axial alignment with the other shaft, each having an internal-external geared connection with the compound gear, and each being connectible to the other shaft selectively.

5. In a gearing, two shafts in permanent offset axial relation, means intermediate the shafts for connecting them for direct drive, a hollow compound gear in surrounding relation to said intermediate means and in axial alignment with one of the shafts and connectible thereto, and a plurality of gears in axial alignment with the other shaft, each having an internal-external geared connection with the compound gear, and each being connectible to the other shaft selectively.

6. In a gearing a shaft and a power transmitting member permanently out of axial alignment, a hollow sleeve having an interruptable internal-external geared connection with the member for one speed and another interruptable geared connection therewith for another speed, means passing through the sleeve for connecting the shaft to the member for direct drive and means for connecting the shaft directly to the sleeve whereby the shaft may transmit power through either of said interruptable geared connections.

7. In a gearing, a pair of shafts in offset axial relation, means bridging from one shaft to another for connecting the shafts directly together, means for interrupting said connection, and means for driving one shaft from the other in two other speed relations, including a hollow sleeve in surrounding relation to the bridging means and having two interruptable internal-external geared connections with one of the shafts and a direct drive interruptable connection with the other.

8. In a gearing, a pair of rotatable members, a hollow geared sleeve, intermediate means extending through the sleeve for directly connecting the members, mutually rigid sets of teeth on the sleeve, each having an independent interruptable geared connection with one of said rotatable members, and means for connecting the other of said rotatable members to the sleeve and to said intermediate means selectively.

9. In a gearing, a pair of shafts, a hollow sleeve in axial alignment with one of the shafts and carrying mutually rigid sets of internal and external gear teeth, means intermediate the shafts and extending through the sleeve for directly connecting the shafts, gears meshing with the said internal and external teeth, means for connecting each of the latter gears to one shaft, and means for connecting the other shaft to the sleeve and to said intermediate means.

10. In a gearing, two shafts, means intermediate the shafts for connecting them for direct drive, a hollow compound gear in surrounding relation to said intermediate means and in axial alignment with one of the shafts and connectible thereto, a plurality of gears each having an internal-external geared connection with the compound gear, and a selective clutch for connecting the other shaft to said last mentioned gears.

11. In combination two shafts and an axially inclined member for connecting the shafts directly together, a gear train consisting of nested hollow internal and external gears in eccentric relation through at least one of which the inclined member passes, and clutch members for each of the first named shafts, each being arranged to connect the respective shaft to the inclined member and to a respective element of the gear train.

12. In a gearing, two longitudinally separated axially offset shafts, connecting means therefor extending substantially from the inner end of one to the inner end of the other, means to interrupt such connection, a hollow compound gear through which the connecting means passes, a plurality of gear members each having an internal-external geared connection with the compound gear and clutch means to establish at least two driving connections other than the direct drive, one being through the compound gear and one of the gear members, another being through the compound gear and the other gear member.

13. In a gearing, two axially offset shafts, means including an inclined shaft and clutches for connecting the adjacent ends of the offset shafts for direct drive, a hollow compound gear in surrounding relation to the inclined shaft and engageable by one of the clutches to effect a connection between one of the offset shafts and the compound gear, a plurality of concentrically mounted gears in mesh with teeth of the compound gear, one of the clutches being permanently connected to the other of the first named shafts and capable of selectively connecting this shaft to each of the concentrically mounted gears.

14. In a gearing, a pair of axially offset shafts, means including a stub shaft and an inclined shaft for connecting the adjacent ends of the first named shafts, gear teeth carried by the stub shaft, a compound geared sleeve mounted concentrically with one shaft and having teeth meshing with the aforesaid gear teeth, means to interrupt the connection between one of the first named shafts and the inclined shaft and to connect such first named shaft to the sleeve, clutch means to connect the other of said first named shafts to the stub shaft, and another gear meshing with teeth of the sleeve and having an interruptable connection with said last mentioned other shaft.

15. In a gearing, a pair of axially offset shafts, rotatable members in alignment with each of the shafts, clutch means for connecting each shaft to its respective rotatable member, an inclined shaft having universal joint connection with both rotatable members, a hollow compound gear having two mutually rigid sets of teeth, said gear being connectible to one of the shafts, two gears in mesh with teeth of the compound gear one being rigid with one of the rotatable members and the other being journalled for rotation relative to the last mentioned rotatable member and coaxial therewith, and means for selectively connecting the other shaft to said last mentioned rotatable member and to the relatively rotatable gear.

16. In a gearing, a pair of axially offset members, a stub shaft journalled for relative rotation in alignment with one of the members, a stub shaft similarly journalled in alignment with the other member, a permanent direct driving connection between the stub shafts, a hollow compound gear having mutually rigid sets of teeth, through which hollow gear the said direct connection passes, a cooperating set of teeth in permanent mesh with teeth of the compound gear and carried by one of the stub shafts, a gear member coaxial with the last mentioned stub shaft and in mesh with another set of teeth of the compound gear, clutch members drivingly rigid with each first mentioned shaft and selectively engageable with respective stub shafts, one clutch member being also engageable with the compound gear, and the other clutch member being also engageable with the said coaxial gear member.

17. In a gearing, a casing, a pair of axially offset shafts carried thereby, an intermediate inclined shaft, a compound hollow gear having a fixed bearing in the casing concentric to one of the shafts and surrounding the intermediate shaft, two members each having an internal-external geared connection with the compound gear, means for connecting the first named shafts directly through the intermediate shaft, means to connect them through the intermediacy of the compound gear and one of said members for a different speed and means to connect them through the intermediacy of the compound gear and the other of said members for a third speed.

18. In a gearing, a casing, a pair of axially offset shafts carried thereby, a compound hollow gear having a fixed bearing in the casing concentric to one of the shafts, means extending through the hollow gear for directly connecting the shafts, two gear members each having an internal-external geared connection with the compound gear, and clutch means to render the direct connection active for one speed, to connect the shafts through the intermediacy of the compound gear and one of said gear members for a different speed, to connect them through the intermediacy of the compound gear and the other of said members for a third speed, and to connect them through the intermediacy of both gear members and the compound gear for a fourth speed.

19. Change speed gearing, comprising a drive shaft and a driven shaft in axially offset relation, means to connect the shafts so that both rotate in unison, means to connect the shafts for other speeds comprising two gears concentric with the driven shaft and connectible thereto and a hollow compound gear through which the direct connecting means passes, the latter gear being connectible to the drive shaft and in mesh with the two previously mentioned gears, and a reversing gear train interposed between the driving and driven shafts, one extreme element of which gear train connects with one of said two concentric gears and the other extreme element with the driven shaft.

20. In a gearing, two shafts, intermediate means for connecting the shafts for direct drive, a hollow compound gear in surrounding relation to said intermediate means and in axial alignment with one shaft and connectible thereto, two coaxial gears each having an internal-external geared connection with the compound gear and connectible to the other shaft selectively, reversing gearing interposed between the last mentioned shaft and one of the last mentioned gears and means for rendering the reversing gearing active and idle.

21. In a gearing, two shafts, two gear members concentric with one shaft and a compound geared sleeve concentric with the other and having separate sets of teeth in mesh with respective concentric gear members, means to connect and disconnect the respective shafts to and from the respective concentric gear members, reversing means interposed between one of the first named concentric gear members and the shaft concentric therewith and means to render the reversing means active and idle.

22. In a gearing, a compound gear having internal and external teeth, a plurality of concentric gear members, having teeth in mesh with the teeth of the compound gear, a shaft having an interruptable driving connection with each of the concentric gear members, and a gear train comprising a gear driven from one of the concentric gear members, a gear drivingly rigid with the shaft and an intermediate gear member connected to both last mentioned gears whereby reverse rotation between the shaft and compound gear is secured.

23. In a gearing, a pair of axially offset shafts, connecting means therefor extending substantially from the inner end of one shaft to the inner end of the other, means to interrupt such connection, a hollow compound gear through which the connecting means passes, a plurality of gear members each having an internal-external geared connection with the compound gear, means to connect one of the shafts to the compound gear, means to connect the other shaft to either of said gear members and a reversing gear interposed between one of said gearing members and the last mentioned shaft.

24. In a gearing, two shafts, means intermediate the shafts for directly connecting them, a hollow compound gear in surrounding relation to said means and connectible to one of the shafts, internal and external gears in mesh with respective sets of teeth on the compound gear, each being connectible to the other shaft and one having an externally toothed hub, a countershaft, a gear member carried thereby having teeth meshing with the teeth of the said hub, a gear rigid with said other shaft, and an idler gear in permanent mesh with one of the two last mentioned gears and engageable with the other for effecting an interruptable reverse rotation between the first mentioned shafts.

25. In a gearing, a casing, a pair of shafts supported thereby, in axially offset relation, a gear train comprising a hollow gear member having separated bearing supports carried by the casing externally of the member, said member being in axial alignment with one of the shafts, and a plurality of gears meshing with the compound gear and coaxial with the other shaft, means extending through the compound gear for connecting the shafts for direct drive, and clutch means associated with each shaft for establishing driving connections between the shafts through said direct connecting means and through the gear train.

26. In a gearing, a casing, a shaft, a pair of relatively rotatable members coaxial with the shaft and connectible thereto, separated rolling bearings interposed between the members, a bearing support carried by the casing for one of the rotatable members, internal and external gear teeth carried by respective rotatable members, a compound gear having teeth in mesh with respective internal and external gears and an eccentric bearing therefor carried by the casing, and means for transmitting power to or from the compound gear.

27. In a gearing, a casing, a shaft, a pair of relatively rotatable members coaxial with the shaft and connectible thereto, a bearing interposed between the members, a bearing support carried by the casing for one of the rotatable members, internal and external gear teeth carried by respective rotatable members, a compound hollow gear having teeth in mesh with respective internal and external gears and an eccentric bearing therefor carried by the casing, another shaft, means extending through the hollow gear for connecting the shafts for synchronous rotation, and means for connecting the last named shaft to the hollow gear.

28. In a gearing, a two part casing, a pair of axially offset shafts, two coaxial gears adjacent one shaft and a selective dental clutch for connecting this shaft to either gear, a bearing for one gear supported by one casing section, a hollow compound gear meshing with both aforesaid gears, a bearing support for the compound gear in the other section, a selective clutch for connecting the other shaft to the compound gear and means including the latter clutch and an element passing through the hollow gear for directly connecting the shafts, one shaft, clutch and the compound gear being slidable endwise into one casing section and the other shaft clutch and the two gears being slidable endwise into the other section for assembly.

29. In a gearing, two concentric gears, one having internal teeth and the other external teeth, a shaft selectively connectible to said gears, a hollow compound gear having separate sets of teeth for meshing with the teeth of the concentric gears, power transmitting means and connections therefrom for driving the compound gear in a given direction, thereby transmitting power to the shaft at greater or less speed than that of the compound gear depending upon which concentric gear is connected to the shaft, and means extending through the compound gear and directly connected to one of the concentric gears, said last named means having direct driving connections with the power transmitting means, for driving the shaft therefrom without change of speed and exclusive of the gears.

CHARLES E. F. AHLM.
GEORGE M. SOULE.